UNITED STATES PATENT OFFICE.

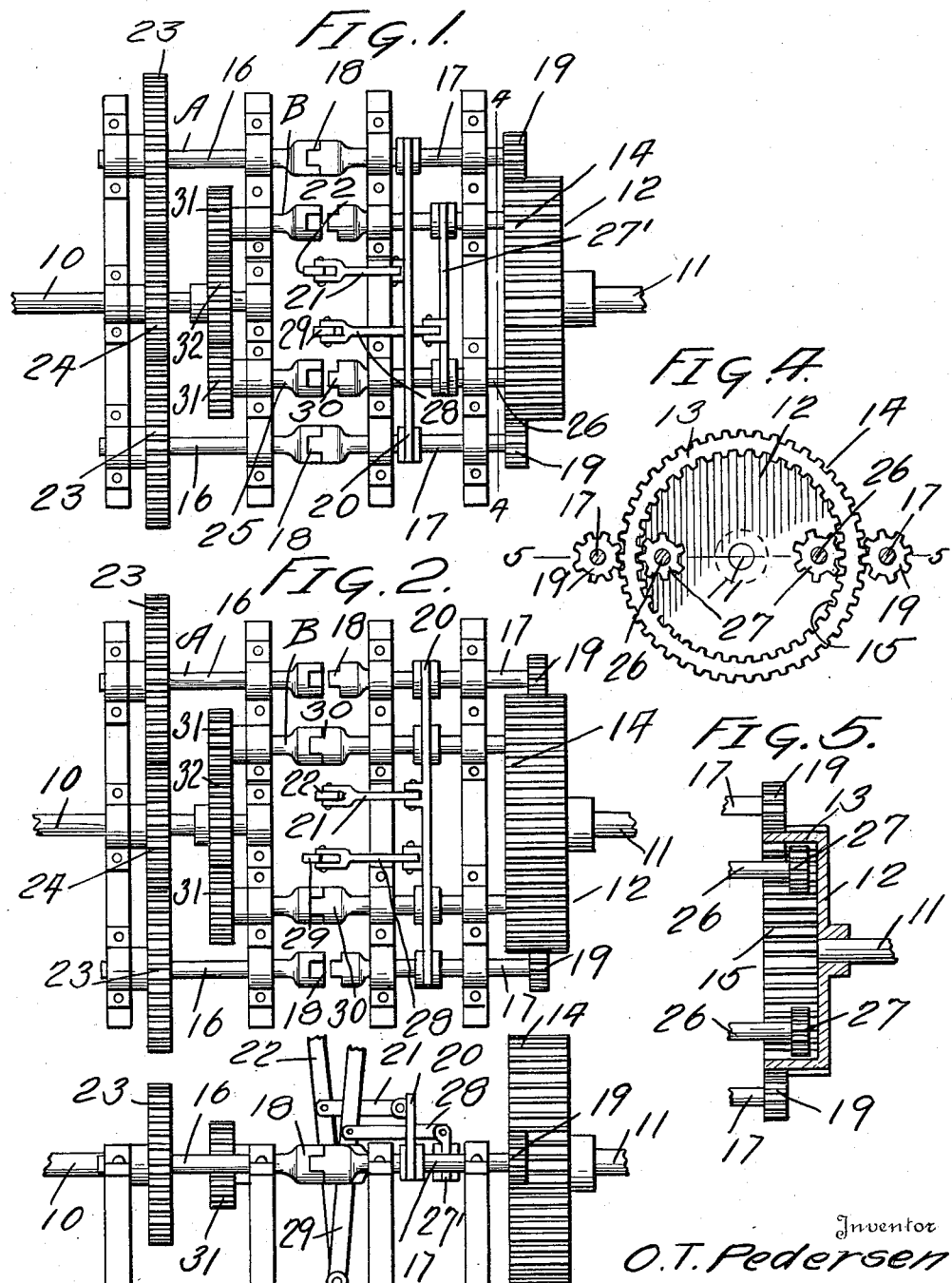

OLAVES T. PEDERSEN, OF NORTH BEND, OREGON.

DRIVE AND REVERSE GEAR.

1,165,019.  Specification of Letters Patent.  Patented Dec. 21, 1915.

Application filed April 16, 1915. Serial No. 21,697.

*To all whom it may concern:*

Be it known that I, OLAVES T. PEDERSEN, a citizen of the United States, residing at North Bend, in the county of Coos, State of Oregon, have invented certain new and useful Improvements in Drive and Reverse Gears; and I do hereby declare the following to be a full, clear, and exact description of the invention, such as will enable others skilled in the art to which it appertains to make and use the same.

This invention relates to a drive and reverse gear and particularly to a gear of this type adapted for use in connection with propeller shafts.

The object of the invention resides in the provision of a device of the character named embodying an improved construction for effecting the rotation of a driven shaft at a speed greatly in excess of that of the engine shaft and for effecting reversal of rotation of the driven shaft.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a drive and reverse gear constructed in accordance with the invention and with the parts in position to drive the driven shaft at a high speed of rotation; Fig. 2, a view similar to Fig. 1 with the parts in position to effect reverse rotation of the driven shaft; Fig. 3, a side elevation of what is shown in Fig. 1; Fig. 4, a section on the line 4—4 of Fig. 1, and Fig. 5, a section on the line 5—5 of Fig. 4.

Referring to the drawings 10 indicates the driven or propeller shaft and 11 the engine or driving shaft. Fixed on the engine shaft 11 is a disk 12 provided with an annular flange 13 having circumscribing gear teeth 14 on the outer periphery thereof, while gear teeth 15 are formed on the inner periphery of said flange. Journaled in suitable bearings on each side of the shaft 10 are shafts A each formed of sections 16 and 17, the latter being slidable longitudinally in their supporting bearings, so as to permit same to be attached to and detached from the corresponding section 16. Suitable clutch elements 18 are provided on adjacent ends of the sections 16 and 17 to effect their attachment and detachment. Fixed on each shaft 17 is a gear 19 which meshes with the teeth 14. The sections 17 are connected by a rod 20 and this rod is in turn connected by a link 21 to a pivoted lever 22 so that by manipulating said lever the sections 17 can be moved in unison into and out of engagement with respective sections 16. Fixed on each section 16 is a gear 23 which meshes with a gear 24 fixed on the shaft 10 and whereby the rotation of the shaft 11 is transmitted to the shaft 10 when the clutch elements 18 are operatively connected. Also journaled in suitable bearings on each side of the shaft 10 and between the shafts A and the shaft 10 are shafts B each of which is formed of sections 25 and 26, the latter being slidable longitudinally in its supporting bearings and having fixed thereon a gear 27 meshing with the teeth 15. The adjacent ends of the sections 25 and 26 are provided with clutch elements 30 adapted to be interlocked by longitudinal movement of the sections 26 in one direction. The sections 26 are connected by a rod 27' which is in turn connected by a link 28 to a lever 29 so that said sections can be moved longitudinally in unison to operatively connect the clutch elements 30. Fixed on each section 25 is a gear 31 which meshes with a gear 32 fixed on the shaft 10. If it is desired to rotate the shaft 10 at high speed the sections 17 are moved longitudinally to throw in the clutch elements 18. On the other hand if it is desired to reverse the rotation of the shaft 10 the clutch elements 18 are thrown out and the clutch elements 30 thrown in.

What is claimed is:

In a drive and reverse gear, the combination of a driven shaft, a drive shaft, a disk fixed on the driven shaft, an annular flange on the outer end of said disk, teeth on the inner and outer peripheries of said flange, shafts rotatably mounted on each side of the driven shaft and including separate sections one of which is mounted for longitudinal movement, gears fixed on the longitudinally movable sections and meshing with the teeth on the other periphery of said flange, means for moving said sections longitudinally in unison, gears fixed on the other sections of said shaft respectively, a gear fixed on the drive shaft and meshing with the gears on fixed sections of the sectional shafts, third shafts rotatably mounted respectively on opposite sides of the driven shaft and between the sectional shafts, each of said third shafts including separate sections one of which is mounted for longitudinal movement, gears fixed on the longitudinally movable sections of the third shafts and meshing with the teeth on the inner periphery of said flange, means for moving the last named sections longitudinally in unison and clutch elements on the adjacent ends of the shaft sections.

In testimony whereof, I affix my signature, in the presence of two witnesses.

OLAVES T. PEDERSEN.

Witnesses:
WM. ANDERSON,
PAUL BETTY.

Copies of this patent may be obtained for five cents each, by addressing the "Commissioner of Patents, Washington, D. C."